(12) United States Patent
Avrutsky

(10) Patent No.: US 8,841,916 B2
(45) Date of Patent: Sep. 23, 2014

(54) SYSTEM AND METHOD FOR FLASH BYPASS

(75) Inventor: Mordechay Avrutsky, Alfei Menashe (IL)

(73) Assignee: Tigo Energy, Inc., Los Gatos, CA (US)

( * ) Notice: Subject to any disclaimer, the term of this patent is extended or adjusted under 35 U.S.C. 154(b) by 237 days.

(21) Appl. No.: 13/287,021

(22) Filed: Nov. 1, 2011

(65) Prior Publication Data
US 2012/0217973 A1 Aug. 30, 2012

Related U.S. Application Data

(60) Provisional application No. 61/447,622, filed on Feb. 28, 2011.

(51) Int. Cl.
*G01R 31/26* (2014.01)
*H01L 31/048* (2014.01)

(52) U.S. Cl.
CPC .............. *G01R 31/2605* (2013.01); *Y02E 10/50* (2013.01); *H01L 31/0485* (2013.01)
USPC ............. 324/501; 324/537; 702/58; 136/244; 307/150

(58) Field of Classification Search
CPC ........... G01R 31/2605; H01L 31/0485; H05B 39/042; H05B 41/34
USPC ............. 324/537; 702/58; 136/244; 307/150; 323/271
See application file for complete search history.

(56) References Cited

U.S. PATENT DOCUMENTS

| 5,235,266 | A | 8/1993 | Schaffrin |
| 5,268,832 | A | 12/1993 | Kandatsu |
| 5,604,430 | A | 2/1997 | Decker et al. |
| 5,923,158 | A | 7/1999 | Kurokami et al. |

(Continued)

FOREIGN PATENT DOCUMENTS

| AU | 2005262278 | 7/2005 |
| DE | 4232356 | 3/1994 |

(Continued)

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

(Continued)

*Primary Examiner* — Arleen M Vazquez
*Assistant Examiner* — Neel Shah
(74) *Attorney, Agent, or Firm* — Greenberg Traurig LLP

(57) ABSTRACT

A solar photovoltaic panel is disclosed that includes a photovoltaic cell, a local management unit connected between the cell and a string bus, and a bypass device connected to the cell that is operable to bypass the local management unit when conducting a flash test. The panel preferably further includes a transient detector connected to the cell that is operable to sense an output from the cell having a predetermined transient rise time. The transient detector and the bypass device may be contained within a junction box integrated into the panel and may include the local management unit within the junction box. The transient detector may include a switch connected to a circuit that electrically bypasses the local management unit when the switch is turned on as a result of an output transient rise time less than the predetermined time, thus facilitating a flash test of the photovoltaic panel.

19 Claims, 8 Drawing Sheets

(56) References Cited

U.S. PATENT DOCUMENTS

| | | |
|---|---|---|
| 6,275,016 B1 | 8/2001 | Ivanov |
| 6,448,489 B2 | 9/2002 | Kimura et al. |
| 6,650,031 B1 | 11/2003 | Goldack |
| 6,844,739 B2 | 1/2005 | Kasai et al. |
| 6,894,911 B2 | 5/2005 | Telefus et al. |
| 6,984,970 B2 | 1/2006 | Capel |
| 7,061,214 B2 | 6/2006 | Mayega |
| 7,248,946 B2 | 7/2007 | Bashaw et al. |
| 7,256,566 B2 | 8/2007 | Bhavaraju et al. |
| 7,276,886 B2 | 10/2007 | Kinder |
| 7,518,346 B2 | 4/2009 | Prexl |
| 7,595,616 B2 | 9/2009 | Prexl |
| 7,605,498 B2 | 10/2009 | Ledenev et al. |
| 7,719,140 B2 | 5/2010 | Ledenev et al. |
| 2005/0057214 A1 | 3/2005 | Matan |
| 2005/0057215 A1 | 3/2005 | Matan |
| 2006/0001406 A1 | 1/2006 | Matan |
| 2006/0174939 A1 | 8/2006 | Matan |
| 2006/0185727 A1 | 8/2006 | Matan |
| 2007/0273351 A1 | 11/2007 | Matan |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0303503 A1 | 12/2008 | Wolfs |
| 2009/0146667 A1* | 6/2009 | Adest et al. ............... 324/537 |
| 2010/0207455 A1* | 8/2010 | Erickson et al. ............ 307/82 |
| 2011/0125431 A1* | 5/2011 | Adest et al. ............... 702/58 |
| 2012/0255591 A1* | 10/2012 | Arditi et al. ............... 136/244 |

FOREIGN PATENT DOCUMENTS

| | | |
|---|---|---|
| DE | 19961705 | 7/2001 |
| EP | 1388774 | 2/2004 |
| ES | 2249147 | 3/2006 |
| WO | 03012569 | 2/2003 |

OTHER PUBLICATIONS

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Roman, Eduardo, et al., "Intelligent PV Module for Grid-Connectred PV Systems," IEEE Transactions on Industrial Electronics, vol. 53, No. 4, pp. 1066-1073, Aug. 2006.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

SYSTEM AND METHOD FOR FLASH BYPASS

CROSS REFERENCE TO RELATED APPLICATIONS

This application claims the benefit of priority of U.S. Provisional Patent Application Ser. No. 61/447,622 filed Feb. 28, 2011, which is incorporated herein by reference in its entirety.

FIELD OF THE TECHNOLOGY

This disclosure relates generally to solar panels and more particularly to test methods and systems for solar panels during manufacture.

BACKGROUND

During manufacturing, solar panel manufacturers need to test the performance of solar panels equipped with an intelligent junction box (Jbox). It is desirable to do this by executing a flash test (subjecting the panels to a flash of light), which test time lasts from a few milliseconds up to 100 milliseconds. Such a flash as is required for this particular testing would not affect the output of the entire device (panel plus Jbox). However, existing Jbox design does not support such tests.

The Jbox has within it a Local Management Unit (LMU). This LMU is typically initially in an OFF mode. The typical Jbox turn-on cycle is longer than a few milliseconds, because a smart, i.e. an intelligent, Jbox must make panel validation tests before turning on.

Solar panel testing needs to cover the full assembly of a panel together with a smart Jbox. Mounting smart Jbox electronics that are fed from the panel affects panel testing and does not permit correct stand-alone panel testing.

In the field, sunlight always increases slowly, according to sunrise behavior. A flash test resembles only production mode. There is no light definition to the conditions prior the flash testing. Flash test characteristics are definable. That is, pulse rise time, pulse length, and expected output power.

What is needed is a system and method to keep the bypass-FET in the LMU on during a solar panel test. The present disclosure provides such a system and method.

SUMMARY OF THE DISCLOSURE

A solar photovoltaic panel in accordance with the present disclosure includes a photovoltaic cell, a local management unit connected between the cell and a string bus, and a bypass device connected to the cell that is operable to bypass the local management unit when conducting a flash test. The panel preferably further includes a transient detector connected to the cell that is operable to sense an output from the cell having a transient rise time less than about 100 milliseconds. Alternatively, the bypass device may be or include a mechanical switch. Alternatively the bypass device may be a transistor switch. Preferably the transient detector and the bypass device may be contained within a junction box integrated into the panel. The local management unit may also be contained within the junction box that is integrated into the solar photovoltaic panel.

In an embodiment that includes a transient detector, the transient detector includes a transistor switch connected to the bypass device. The bypass device itself may be a transistor circuit, or other suitable switching device such as a relay, that electrically bypasses the local management unit when the bypass device is turned on. Alternatively, the bypass device is a manual switch located in the panel or in the local management unit.

One embodiment in accordance with the present disclosure may be a smart junction box for connecting a solar photovoltaic cell to an electrical string bus. This junction box includes a local management unit connected to one or more cells, and a bypass device for electrically bypassing the local management unit and connecting the cell directly to an electrical string bus or a test load during a flash test. In one embodiment, the bypass device includes an electronic circuit including a transistor switch and a transient detector operably connected to the switch. The transient detector is operably connected between the cell and the transistor switch to actuate the switch upon sensing a cell output rise time of less than about 100 milliseconds that is indicative of a light flash, typically only occurring in a test situation or environment.

In some embodiments, the bypass device is a reed switch. Alternatively the bypass device may be a transistor circuit having a switch that electrically bypasses the local management unit when the transistor switch is turned on. In such an embodiment a transient detector may be operably connected between the cell and the circuit to automatically actuate the switch upon sensing a cell output rise time within a predetermined limit of less than about 100 milliseconds to a predetermined level. Such an output would be indicative of a light flash.

Another embodiment of the present disclosure is a method of performing a flash test on a solar photovoltaic panel having a local management unit connected between the cell and a string bus. This method basically includes providing a light flash source facing the panel; providing a bypass device around the local management unit; bypassing the local management unit; applying a light flash to the panel; and measuring the output of the cell during the light flash. Preferably, but optionally, the bypass device and the local management unit may be constructed integral with the photovoltaic panel.

The operation of bypassing preferably includes detecting a cell output signal indicative of a light flash, activating a bypass switch in response to the signal to complete an electrical path from the cell around the local management unit, and receiving the cell output signal. Preferably this entails automatically activating the bypass switch upon detection of an output signal rise time from the cell to a predetermined level in less than 100 milliseconds, and more preferably within about 10 milliseconds.

The disclosure includes methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The present disclosure includes a system and method to keep the bypass-FET on during a solar panel test. In one exemplary embodiment, an electronic bypass may be used for such a purpose, using solid-state electronic devices. In another exemplary embodiment, a mechanical relay, or even a switch that may be triggered on/off for factory testing in accordance with this disclosure.

Figure 1:
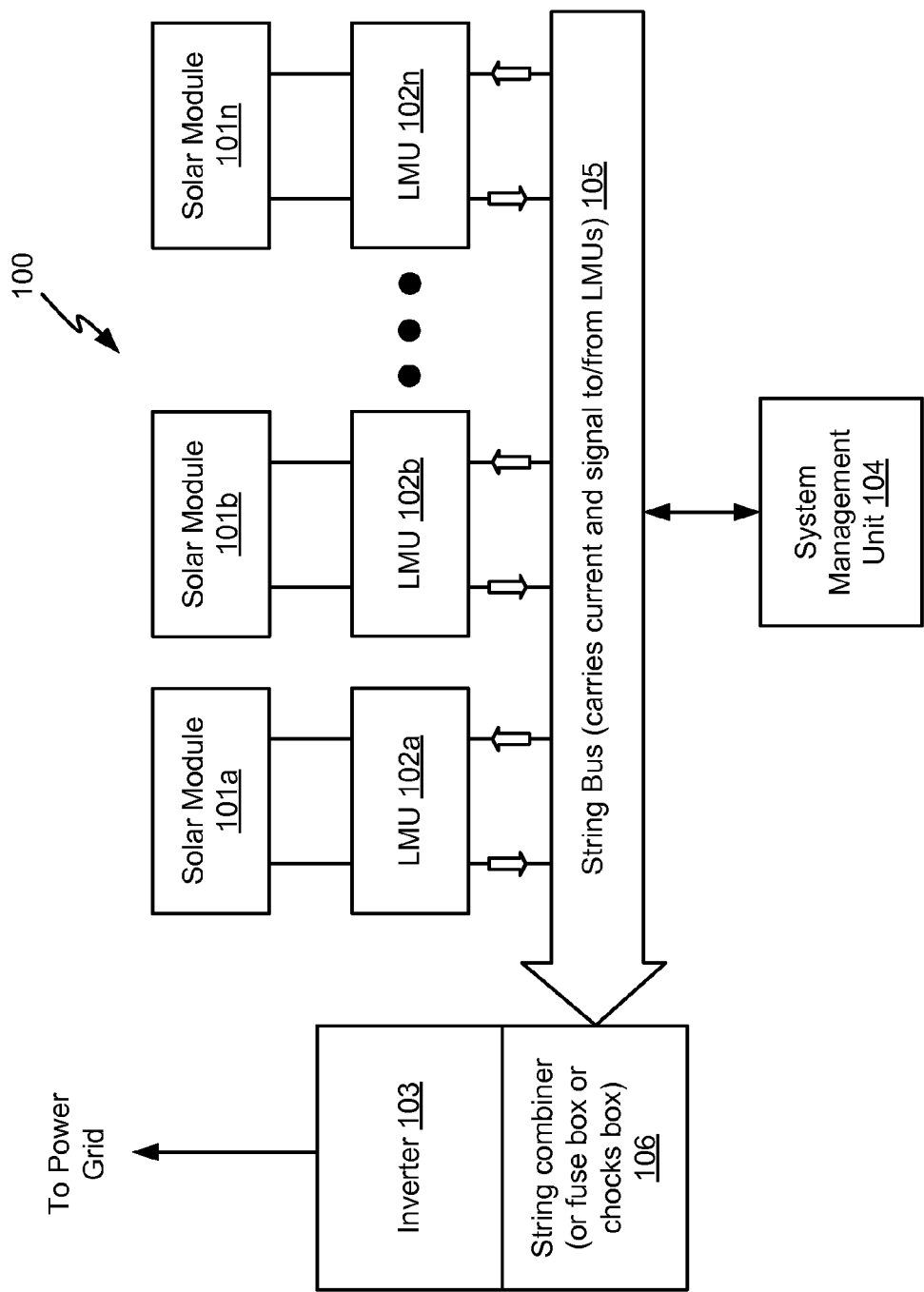
FIG. 1 is a schematic of an exemplary photovoltaic system in accordance with the present disclosure.

Referring now to the drawing, FIG. 1 illustrates an exemplary photovoltaic system 100, according to one aspect of the system and method disclosed herein. Photovoltaic system 100 is built from a few components, including photovoltaic modules 101a, 101b . . . 101n, local management units 102a, 102b . . . 102n, an inverter 103, and a system management unit 104.

The system management unit 111 may be part of the inverter 103, the combiner box 106, a local management unit, or may be constructed as a stand-alone unit. The solar modules 101a, 101b . . . 101n are connected in parallel to the local management unit units 102a, 102b . . . 102n respectively, which are connected in series to form a string bus 105, which eventually is connected to an inverter 103 and the system management unit 111.

In FIG. 1, the string bus 105 can be connected to the inverter 103 directly or as part of a mesh network and combiner boxes or fuse boxes (not shown). An isolated local management unit can be used as a combiner box 106 to adjust all voltages before connecting to the inverter 103; or, a single or multi-string inverter can be used. To limit the changes in the voltage of the bus, the system management unit 111 may assign a different phase for each of the local management units 102a, 102b . . . 102n. In one approach, at any given time, a maximum of a predetermined number of solar modules (for example, one single solar module) may be disconnected from the string bus 105.

In one approach, beyond the module connection the local management units 102x can have the signal inputs, including but not limited to three inputs or types of input data, (a) a requested duty cycle input 104a, which can be expressed as a percentage (e.g., from 0 to 100%) of time the solar module 101x is to be connected to the serial power bus 105 via the switch Q1 (206), (b) a phase shift in degrees (e.g., from 0° to 180°) input 104b, and (c) a timing or synchronization pulse input 104c (for example, to keep the local management units synchronized). These inputs 104a, 104b, and/or 104c may be supplied as discrete signals, or can be supplied as data on a network, or composite or modulated signals sent through the power lines or wirelessly, and yet in other cases, as a combination of any of these input types. In one approach, the phase input 104b and the synchronization pulse input 104c are used to further improve performance, but the local management units 102x can work without them. Depending on the type of signal, additional receivers for these signals could be needed, but are not shown for clarity in this diagram. In some cases, these receivers may be shared with the local management unit, for example.

In one approach, the local management unit 102 may provide output signals. For example, the local management unit 102 may measure current and voltage at the module side and optionally measure current and voltage in the string side. The local management unit 102 may provide other suitable signals, including but not limited to measurements of light, temperature (both ambient and module), etc. In one approach, the output signals from the local management unit 102x may be transmitted over the power line (for example, via power line communication (PLC)), or transmitted wirelessly.

In one approach, the system management unit 111 receives sensor inputs from light sensor(s), temperature sensor(s), one or more each for ambient, solar module or both, to control the photovoltaic system 100. In one approach, the signals may also include synchronization signals. For example, using the described methods, the local management unit 102x can be a very non-expensive and reliable device that can easily increase the throughput of a photovoltaic solar system by a few (for example, signal or low double digits) percentage points. These varied controls also allow installers using this kind of system to control the VOC (open circuit voltage) by, for example by shutting off some or all modules. For example, by using the local management units 102x of the system 100, a few modules can be disconnected from a string if a string is getting to the regulatory voltage limit, thus more modules can be installed in a string.

In some approaches, local management units 102x can also be used within the solar panel to control the connection of solar cells attached to strings of cells within the solar panel 101x.

Figure 2:
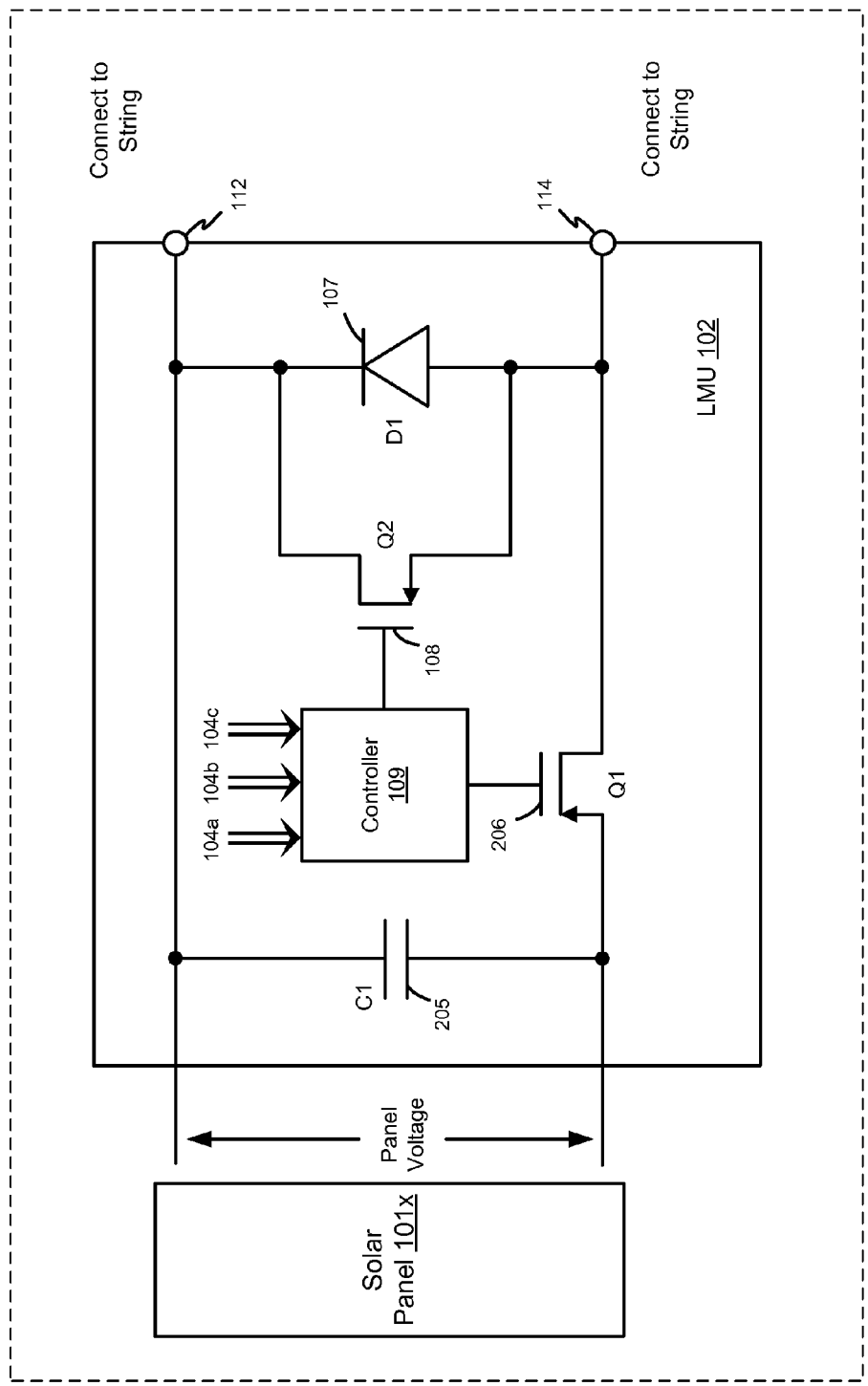
FIG. 2 is a schematic of the interior of an enhanced LMU panel in accordance with the present disclosure.

FIG. 2 shows the interior of an exemplary enhanced panel 200, according to one aspect of the system and method disclosed herein, with standard solar panel 101x and local management unit (LMU) 102x. LMU 102x could be integrated into the Jbox or, in some cases, into the panel itself LMU 102x provides two connectors 112 and 114 for serial connections with other local management units 102x to form a serial power bus 103. The controller 109 controls the states of the switches Q1 206 and Q2 108. When the controller 109 turns on the switch 206, the panel voltage and the capacitor C1 205 are connected in parallel to the connectors 112 and 114. The output voltage between the connectors 112 and 114 is substantially the same as the output panel voltage. During the period the switch 206 is turned off (open), the controller 109 turns on (closes) the switch 108 to provide a path around the diode D1 107 to improve efficiency. When the switch 206 is turned off (open), the panel voltage charges the capacitor C1 205, such that when the switch 206 is turned on, both the solar panel and the capacitor 205 provides currents going through the connectors 112 and 114, allowing a current larger than the current of the solar panel 101 to flow in the string (the serial power bus 105). When the switch 206 is turned off (open), the diode D1 107 also provides a path between the connectors 112 and 114 to sustain the current in the string, even if the switch 108 is off for some reasons. The configuration shown in FIG. 2 is applicable when the output load has ohmic characteristics only. An inductor may also be provided between the connector 114 and the junction of Q1 D1 if the output load has a large input capacitance, such as an inverter.

In one approach, the controller 109 is connected (not shown in FIG. 2) to the panel voltage to obtain the power for controlling the switches Q1 206 and Q2 108. In one approach, the controller 109 is further connected (also not shown in FIG. 2) to at least one of the connectors to transmit and/or receive information from the string bus 105. In one approach, the controller 109 includes sensors (not shown in FIG. 2) to measure operating parameters of the solar panel, such as panel voltage, panel current, temperature, light intensity, etc.

Figure 3:
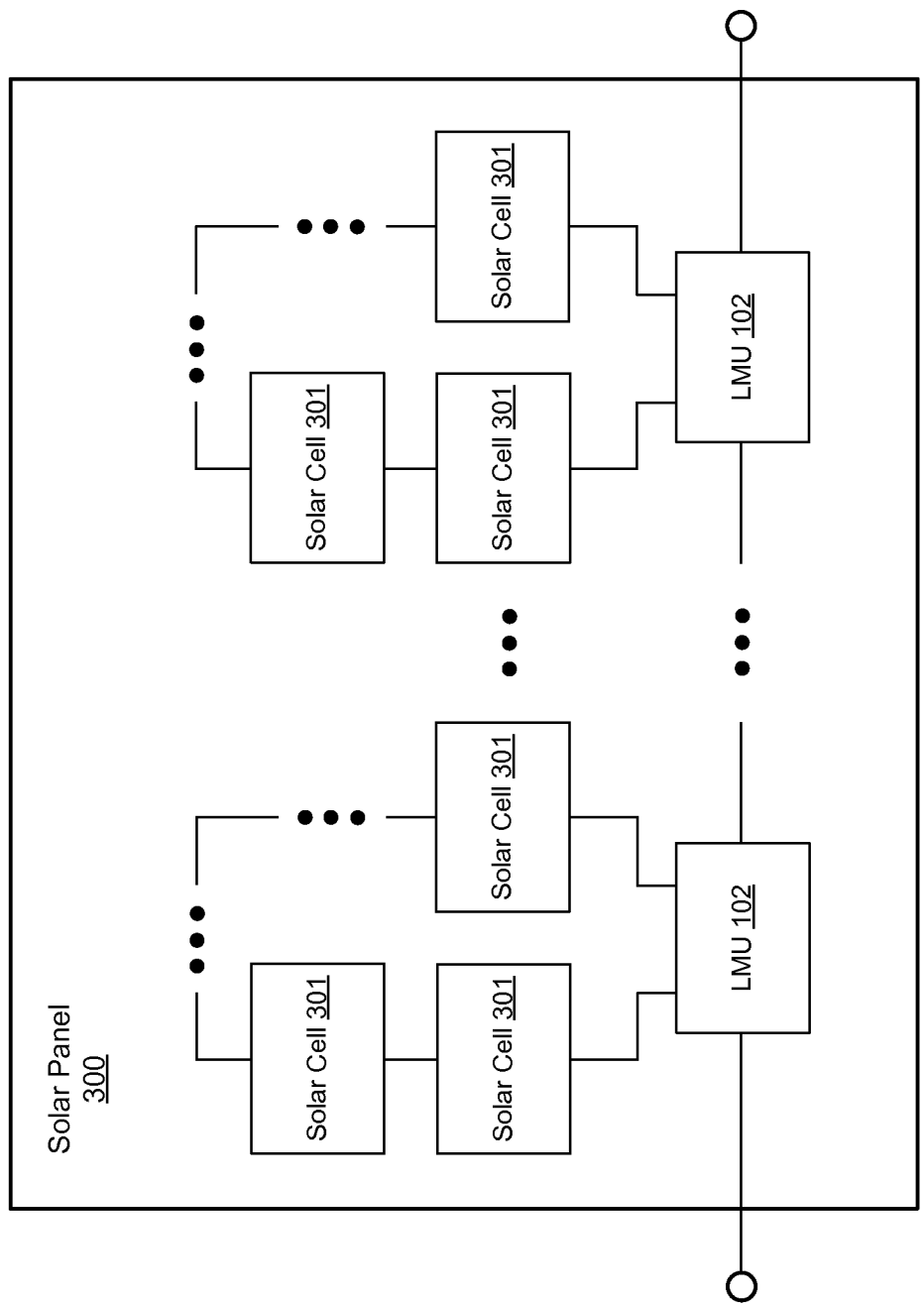
FIG. 3 is a block diagram of a solar panel in accordance with the present disclosure.

FIG. 3 illustrates an exemplary solar panel 300 according to one aspect of the system and method disclosed herein. In this example, solar panel 300 has multiple solar cell strings and multiple LMUs 102*x*. Depending on the actual wiring, some, solar panel 300 may need one or more bypasses in accordance with the present disclosure.

Further, a local management unit 102 can be applied to a group of cells 301 within a string of an individual solar panel 300, or in some cases to each cell 301 in a solar panel 300. A group of solar cells 301 that are attached to a local management unit 102 may be connected to each other in series, in parallel, or in a mesh configure. A number of local management units 102 connect the groups of the solar cells 301 in a string to provide output for the solar panel 300.

Some approaches of the disclosure includes methods to determine the duty cycles and/or phases for local management units 102*i* connected to a string or mesh of solar modules.

In some approaches, the duty cycle of all local management units 102 in a string or mesh can be changed, to increase or decrease the string voltage. The duty cycles may be adjusted to avoid exceeding the maximum voltage allowed. In some approaches, the duty cycle of one local management unit 102 in a string can be changed to cause higher current in that local management unit 102 and overall higher power harvesting.

In one approach, the duty cycles are computed for the solar modules that are connected to a string via the corresponding local management units. The duty cycles can be calculated based on the measured current and voltages of the solar modules and/or the temperatures. After an initial set of duty cycles is applied to the solar modules, the duty cycles can be further fine tuned and/or re-adjusted to changes, such as shifting shading etc., one step a time, to improve power performance (for example, to increase power output, to increase voltage, to increase current, etc.). In one approach, target voltages are computed for the solar modules, and the duty cycles are adjusted to drive the module voltage towards the target voltages. The methods to compute the duty cycles of the solar modules can also be used to compute the duty cycles of the groups of solar cells within a solar module.

Figure 4:
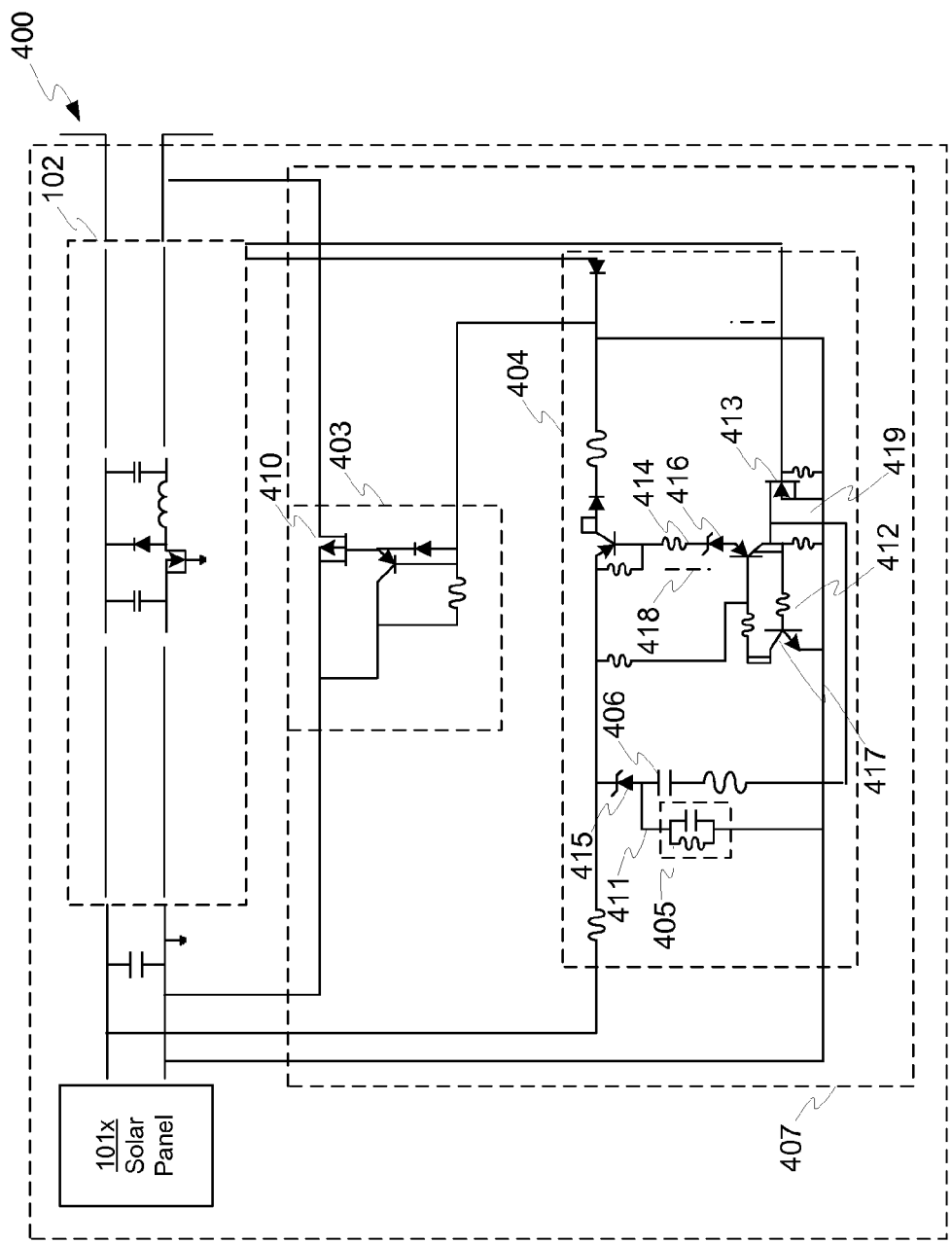
FIG. 4 is a schematic diagram of an electronic bypass system in accordance with the present disclosure.

FIG. 4 shows an exemplary implementation of the electronic bypass configuration 400, according to one aspect of the system and method disclosed herein. Shown in the bypass configuration 400 are an exemplary solar panel 101*x* and LMU 102 within a junction box, such as Jbox 504 shown in FIG. 5. Bypass system 407, connected to the Jbox 504, contains the actual bypass switch with controls 403 and a light flash condition detector 404.

This bypass system circuit 407 contains a flash condition detector 404 and a latch 412 to hold the bypass switch on during the flash and following current voltage (IV) curve test that is performed as part of the flash test. Bypass transistor 410 is controlled by the latch 412. Threshold detector 411 turns the latch 412 on via filters 405 and 406, and Zener diode D1 (415). The latch 412 mainly consists of transistors Q1 (416) and Q4 (417) and the latch can be reset via flash circuit disable switch transistor Q5 (413) controlled by the latch 412. Although preferably mounted in or at the junction box (Jbox), other suitable configurations or locations may be chosen.

The output of latch 412 only becomes functional when the voltage at Zener diode D21 (418) exceeds its threshold. The latch 412 is reset when either the voltage at diode D21 (418) drops below its threshold (typically about 10V), or disable switch 413 disables the flash circuit during normal panel operation. In particular, the filter components, that is, filter 405 for filtering noise and filter 406 for detecting a fast light transition, are used together to detect a flash test, which is characterized by a very rapid change from darkness to maximum light intensity.

In standard field situations a panel can never go from zero to 100 instantly, because natural light, such as at sunrise or sunset, changes slowly. Even in cases such as, for example, the sun being obscured by a cloud or the shadow of an airplane, it takes a few seconds for the light to change. In a flash test, however, the rise time of light intensity to a predetermined expected output level is very short, less than 100 milliseconds and more typically in the range of a few milliseconds or less. Bypass circuit 400 is only an exemplary circuit, and many of its components or arrangements can be changed without departing from its sprit.

Figure 5:
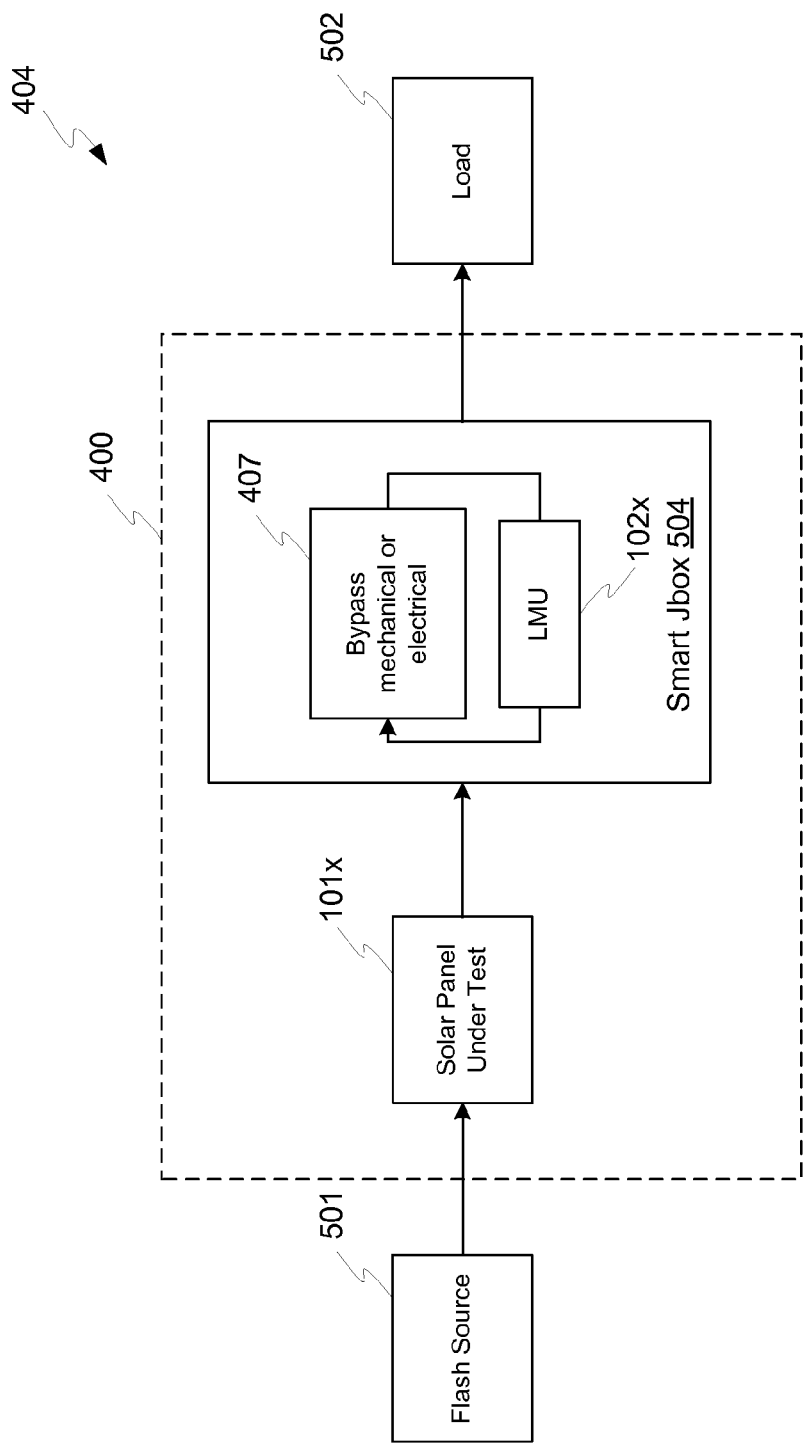
FIG. 5 is a diagram of an exemplary setup for executing a flash test in accordance with the present disclosure.

FIG. 5 shows an exemplary setup 500 for executing a flash test, according to one aspect of the system and method disclosed herein. Flash source 501 is typically a light source, such as, for example, sun lamps, LEDs, or some other, similar high-energy localized light source that can supply sufficient light of the correct wave length for the test. Solar panel 101 is the panel under test, and the Jbox 504 contains an LMU 102 and a bypass device 407, which device may be either mechanical or electrical. Using a test load 502 the output power is measured.

Figure 6:
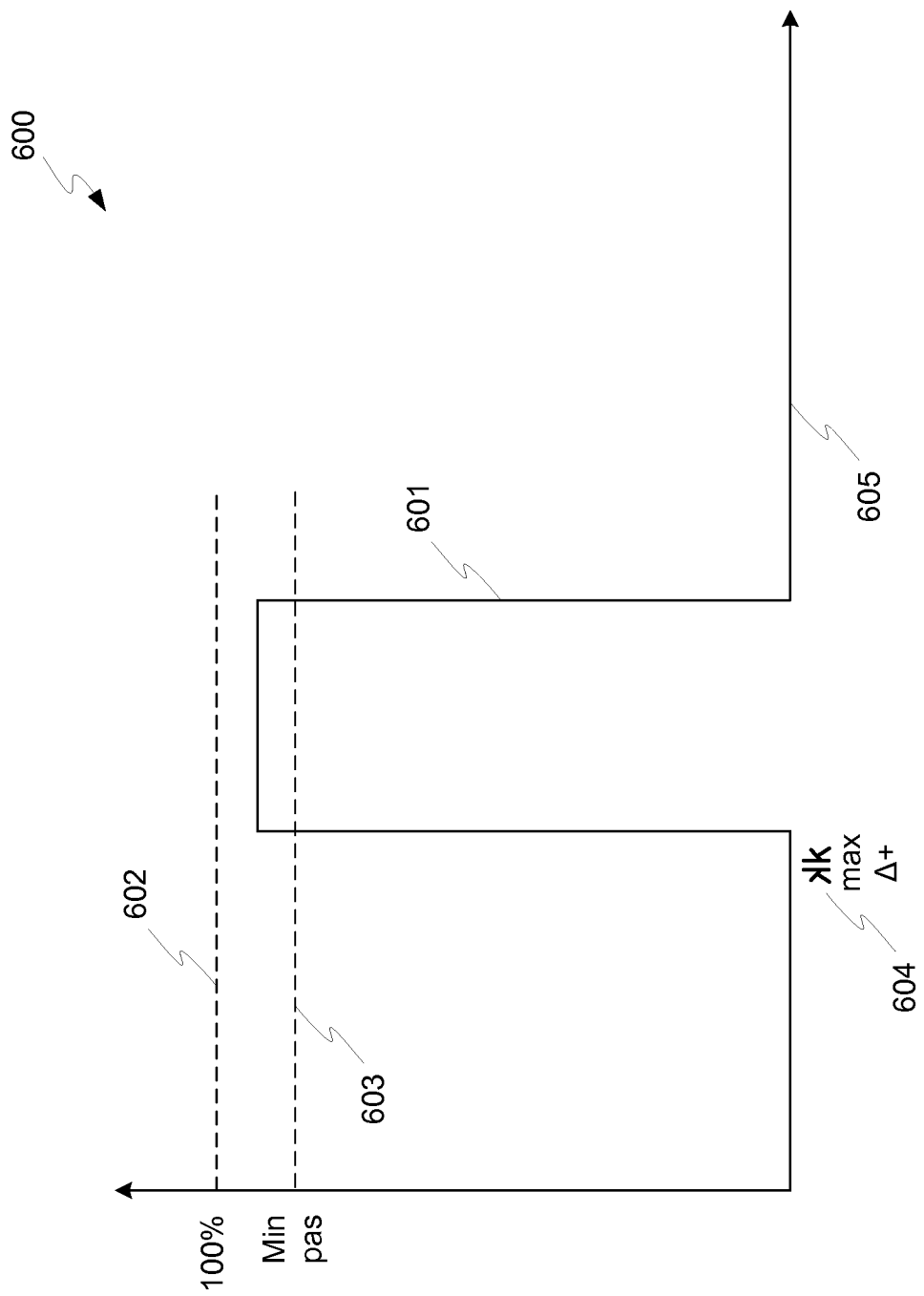
FIG. 6 is a graph of the time and performance of a flash test in accordance with the present disclosure.

FIG. 6 shows an exemplary graphical representation of the time and performance of a flash test 600, according to one aspect of the system and method disclosed herein. Curve 601 describes the output power of the panel under test, over time line 605. Dashed line 602 represents the expected 100 percent output power for the panel 101 under test. The dashed line 603 represents the predetermined minimum acceptable output power line for the test. If the rise time of the output signal 601 to the predetermined minimum is within a predefined parameter $\Delta t$ 604, then the bypass activates by filtering the rising edge of the output power and switching on the bypass circuit 407, or in some other cases, for example, by actuating the switch Q1 206 already present inside an LMU 102*x* in the case of an electronic bypass.

Figure 7:
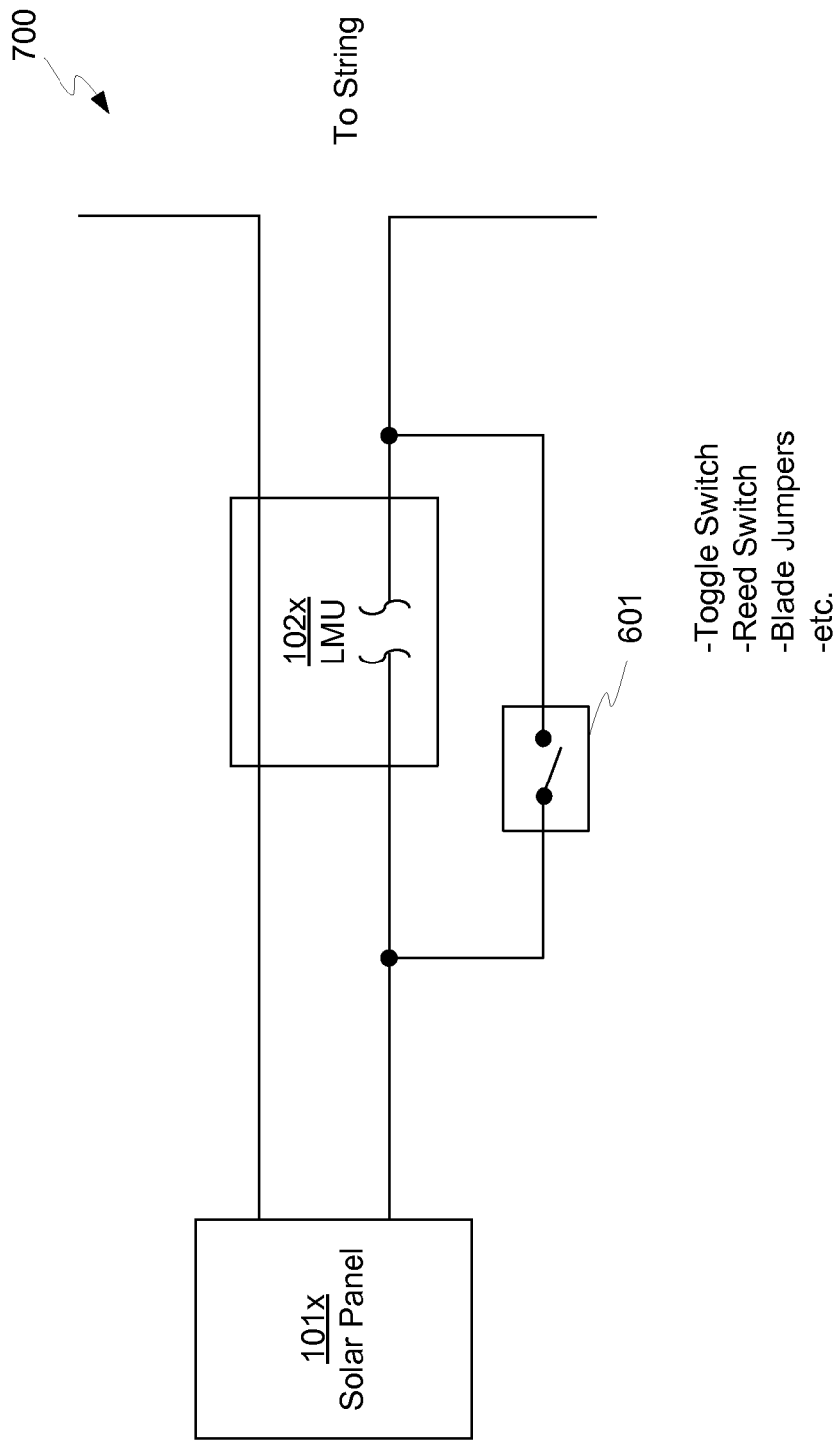
FIG. 7 is a schematic diagram of an alternative mechanical bypass system in accordance with the present disclosure.

Alternatively, a mechanical bypass device can be utilized. FIG. 7 shows an exemplary mechanical bypass device 701, according to one aspect of the system and method disclosed herein. A mechanical bypass 701 may use a relay switch or a simple flip switch activated manually or a reed switch activated, for example, by a magnet on the test bench, to bypass the LMU 102.

Figure 8:
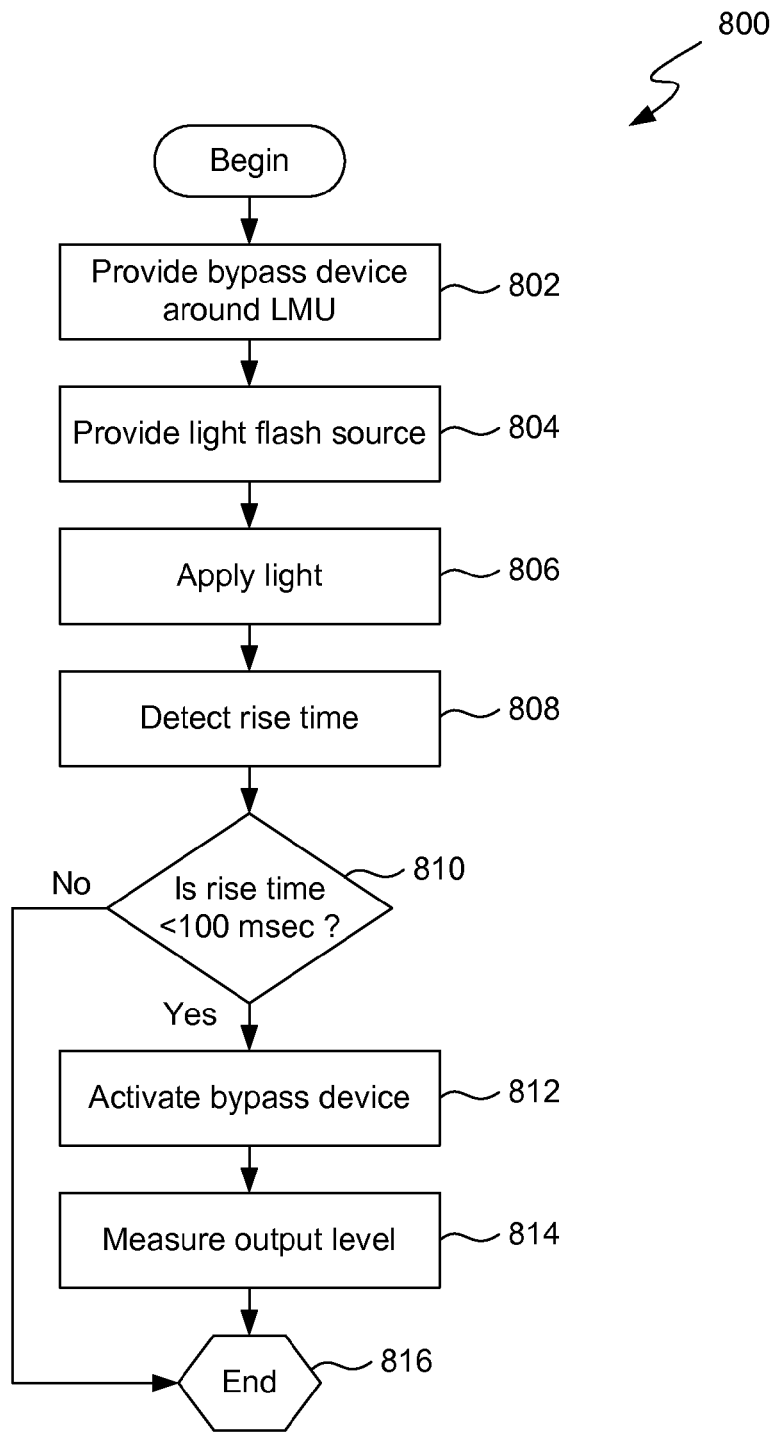
FIG. 8 is a process flow diagram of the method in accordance with an embodiment of the present disclosure.

Referring now to FIG. 8, a process flow diagram of the method 800 of flash test in accordance with one embodiment of the present disclosure is shown with reference to any of the test setups shown in one of FIG. 4, 5 or 7.

The process 800 begins in operation 802 where a bypass device 407 such as an electrical circuit, a mechanical switch 601, or an electrical switch is provided, connected around the local management unit 102 that is connected to a solar photovoltaic cell 101. Operation then transfers to operation 804. Optionally a test load may be connected to the local management unit output in place of a string bus.

In operation 804, a light flash source is placed in proximity to the photovoltaic cell. Operation then transfers to operation 806. In operation 806, the flash source is energized, emitting light onto the cell. The cell then produces an output. Control then transfers to operation 808.

In operation 808, a transient detector senses rise time of the cell output signal. This output is monitored in operation 810 and senses the transient rise. If the output rises to a predetermined level, preferably approaching 100% expected output power of the cell then control transfers to operation 812. If not, then the test fails and the process ends in operation 816.

If this rise time is less than about 100 milliseconds, then in operation 812 the bypass is actuated, and the cell output is passed directly around the local management unit to the string bus or to a test load 502 and is measured in operation 814 via a conventional measurement device (not shown) that may be used in place of the bus for test purposes.

As previously explained, the bypass device is preferably an electronic switch built in to a smart junction box 504 which may be integrally contained within the panel 100. Alternatively a mechanical switch may be built into the panel for this flash test purpose, which can be manually actuated or preferably remotely actuated.

It is clear that many modifications and variations of the system and method disclosed herein may be made by one skilled in the art without departing from the spirit of the novel art of this disclosure. These modifications and variations do not depart from the broader spirit and scope of the invention, and the examples cited here are to be regarded in an illustrative rather than a restrictive sense.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A solar photovoltaic panel, comprising:
   at least one photovoltaic cell;
   a local management unit connected between the at least one cell and an output of the solar photovoltaic panel;
   a flash condition detector configured to detect onset of a light flash of a flash test; and
   a bypass device connected to the cell operable to bypass the local management unit in response to the flash condition detector detecting the onset of the light flash of the flash test.

2. The solar photovoltaic panel of claim 1, wherein the flash condition detector comprising a transient detector connected to the at least one cell and operable to sense an output from the at least one cell having a transient rise time less than 500 milliseconds.

3. The solar photovoltaic panel of claim 1, wherein the bypass device is a mechanical switch.

4. The solar photovoltaic panel of claim 1, wherein the bypass device is a transistor switch.

5. The solar photovoltaic panel of claim 2, wherein the transient detector and the bypass device are contained within a junction box integrated into the solar photovoltaic panel.

6. The solar photovoltaic panel of claim 5, wherein the local management unit is also contained within the junction box integrated into the solar photovoltaic panel.

7. The solar photovoltaic panel of claim 2, wherein the bypass device includes a transistor switch connected to the transient detector.

8. The solar photovoltaic panel of claim 7, wherein the bypass device is a transistor circuit that electrically bypasses the local management unit when the transistor switch is turned on.

9. A junction box, comprising:
   a local management unit connected to one or more photovoltaic cells;
   a flash condition detector configured to detect onset of a light flash of a flash test of the one or more photovoltaic cells; and
   a bypass device configured for electrically bypassing the local management unit in response to the flash condition detector detecting the onset of the light flash of the flash test.

10. The junction box of claim 9, wherein the bypass device comprises a transistor switch; and the flash condition detector comprises a transient detector operably connected to the switch.

11. The junction box of claim 10, wherein the transient detector is operably connected between the cell and the transistor switch to actuate the switch upon sensing an output rise time of less than about 100 milliseconds indicative of a light flash.

12. The junction box of claim 9, wherein the bypass device is a reed switch.

13. The junction box of claim 9, wherein the bypass device is a transistor circuit having a switch that electrically bypasses the local management unit when the transistor switch is turned on.

14. The junction box of claim 13, wherein the flash condition detector comprises a transient detector operably connected to automatically actuate the switch upon sensing an output rise time of less than about 500 milliseconds indicative of a light flash.

15. A method of performing a flash test on a solar photovoltaic panel having a local management unit, the method comprising: providing a light flash source facing the solar photovoltaic panel; providing a bypass device around the local management unit and a flash condition detector; applying a light flash to the solar photovoltaic panel to cause the flash condition detector to detect onset of the light flash and cause the bypass device to bypass the local management unit in response to the flash condition detector detecting the onset of the light flash; and measuring an output of the solar photovoltaic panel during the light flash.

16. The method of claim 15, wherein the bypass device and the local management unit are integral with the solar photovoltaic panel.

17. The method of claim 15, further comprising:
   detecting by the flash condition detector an output signal indicative of the onset of light flash; and
   activating a bypass switch of the bypass device in response to the onset of the light flash being detected, to provide an electrical path around the local management unit.

18. The method of claim 17, further comprising automatically activating the bypass switch upon detection of an output signal rise time to a predetermined level in less than 100 milliseconds.

19. The method of claim 18, wherein the rise time is less than 10 milliseconds.

* * * * *